United States Patent [19]

Sonderegger et al.

[11] Patent Number: 5,297,430
[45] Date of Patent: Mar. 29, 1994

[54] THIN DISK FORCE SENSOR AND METHOD OF MAKING

[75] Inventors: Hans Sonderegger, Neftenbach; Rolf Kuratle, Winterthur; Peter Wolfer, Kleinandelfingen; Reto Calderara, Neftenbach, all of Switzerland

[73] Assignee: Kistler Instrumente AG, Switzerland

[21] Appl. No.: 708,372

[22] Filed: May 31, 1991

[30] Foreign Application Priority Data

May 31, 1990 [CH] Switzerland .............. 01839/90

[51] Int. Cl.$^5$ ................................. G01L 3/00
[52] U.S. Cl. ................ 73/862.043; 73/862.68; 73/DIG. 4
[58] Field of Search ........... 73/862.043, 862.625, 73/862.635, DIG. 4, 862.632, 862.642, 862.68

[56] References Cited

U.S. PATENT DOCUMENTS

| | | | |
|---|---|---|---|
| 3,210,993 | 10/1965 | Shoor et al. | 73/862.625 |
| 4,092,856 | 6/1978 | Kanda | 73/862.635 X |
| 4,425,808 | 1/1984 | Rand | 73/862.635 X |
| 4,802,371 | 2/1989 | Calderara et al. | 73/862.043 |
| 5,151,258 | 9/1964 | Sonderegger et al. | 73/DIG. 4 X |

Primary Examiner—Richard E. Chilcot, Jr.
Assistant Examiner—Elizabeth L. Dougherty
Attorney, Agent, or Firm—Barnes & Thornburg

[57] ABSTRACT

A thin disk force sensor having measuring elements of not more than five layers including force introducing layers welded under preloading to a thin disk housing. The measuring elements, weld and disk housing are planarized. A vapor deposited layer is selectively applied to the force measuring elements to increase the applied force compared to the housing.

16 Claims, 4 Drawing Sheets

THIN DISK FORCE SENSOR AND METHOD OF MAKING

BACKGROUND AND SUMMARY OF THE INVENTION

Disk-shaped and annular force sensors based on piezoelectrics and strain gauges are available commercially. For about 20 years, quartz load washers have become known for measuring dynamic single- and multi-component force processes. This design is characterized by the crystals being arranged between two rigid and solid disks, with the introduced forces transmitted for the most part through the piezo disks. This results in an overall height about two or three times the height of a standard washer. Examples are shown in DP 1 929 478 and CH 476 990 which corresponds to U.S. Pat. No. 3,614,488 and 3,582,691 respectively. As a result of modern amplifier technique, it is enough to detect only part of the effective forces, which is effected most simply by paralleling the force. This however is conditional upon the relation $\alpha$ where $$\alpha = \frac{\text{total force}}{\text{measured part force}}$$

not changing during the observation time. Values of $\alpha$ may range from 2 to 10,000 depending on application. A force sensor of this kind in a rectangular platform is shown in DE 34 40 670 C2. In such measuring plates, commercial piezo force measuring disks are glued. In these plates, very critical installation heights in relation to the measuring plate surface must be modified to within a few microns by adapter plates and thrust washers. One consequent of this serial array of disks (the commercial force measuring disk already has five of them) is a great uncertainty in the detection of the paralleled force transmission. This is because the contact surfaces of eight disks arranged in series have ten air gap layers, which have different ratios of elasticity depending on preloading. Owing to the ten different air gaps, the individual force measuring disks of such a measuring plate will always give different force measuring signals under the same loading, because the effects of the air gap layers are difficult to bring under control.

The purpose of this invention is to provide measuring disks whose measuring elements have not more than half as many air gaps, i.e. less than five. To achieve this, the disks are welded singly into the measuring elements under high preload. After this, the disk surfaces are ground over and possibly lapped together with the cover disks of the measuring elements, to obtain a perfect base or common planar surface. The measuring element cover disks can then be coated with an exactly determine vapor-deposition layer using a stencil. This enables the thin disk force sensor, according to the invention, to be fitted much easier, more accurately and reliable without additional adapter plates and thrust washers to be matched. Moreover, the overall height can be kept much lower, equivalent to that of standard washers, because no commercial force sensors are fitted in it but only components of the force sensors.

According to the invention, measuring elements are fitted in the sensor which may be sensitive in all three space coordinates X, Y, Z as well as to moments M. The defined force paralleling is obtained by vapor deposition onto the ground-over state. The reduction of the number of air gap layers and their minimization by welding under high mechanical preload allows using standardized disk elements and creates a new category of thin disk force sensors.

The invention is based primarily on piezoelectric measuring principles used with impedance transformer or charge amplifier. Quartz ($S1O_2$) is employed usually as piezo material, allowing measuring cycles lasting up to 15 minutes in conjunction with modern charge amplifiers, so that perfect static calibration is possible. With impedance transformers only brief phenomena can be detected, but these can be integrated in simple fashion into the sensors. Commercial impedance transformers for pressure and force sensors are described in the literature under the trade name "Piezotron transducers".

The use of piezo-ceramics yields stronger signals, but they are usable only for short-period measurements, while static calibration is possible though difficult. Nevertheless, they allow much smaller elements, which may offer advantages. However, since quartz plates can be stressed in both compression and shear depending on the crystal out, quartz has proved to be the ideal material for multicomponent dynamometry.

The invention may embody other known sensor techniques however. Thus the use of thin and thick film processes is conceivable, also capacitive principles, though only for single-component force measuring. Nevertheless, the piezoelectric principle is far superior owing to the high rigidity attainable.

The following remarks refer exclusively to piezoelectric arrangements therefore.

Other objects, advantages and novel features of the present invention will become apparent from the following detailed description of the invention when considered in conjunction with the accompanying drawings.

DETAILED DESCRIPTION OF THE DRAWINGS

Figure 1:
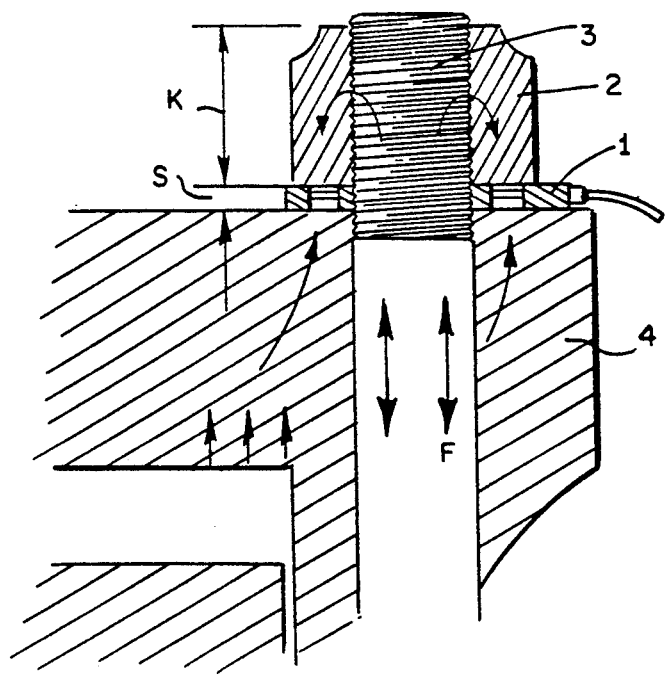
FIG. 1 is a cross-section and review of one application of the thin disk force sensor.

FIG. 1 shows a typical application of the thin disk force sensor 1 according to the invention, fitted between a nut 2 and cylinder cover 4 of a marine diesel engine. Its purpose is to monitor the forces transmitted by the cylinder stud 3, which correspond to the pressure curve in the cylinder. Here it is important to have a force sensor corresponding to the dimensions of normal washers, so that these may be substituted by thin disk force sensors without necessitating mechanical alterations of the stud 3 or cylinder cover 4. The nut 2 has a height K and the force sensor 1 has a height S in the range of 6 to 8 millimeters.

Figure 6:
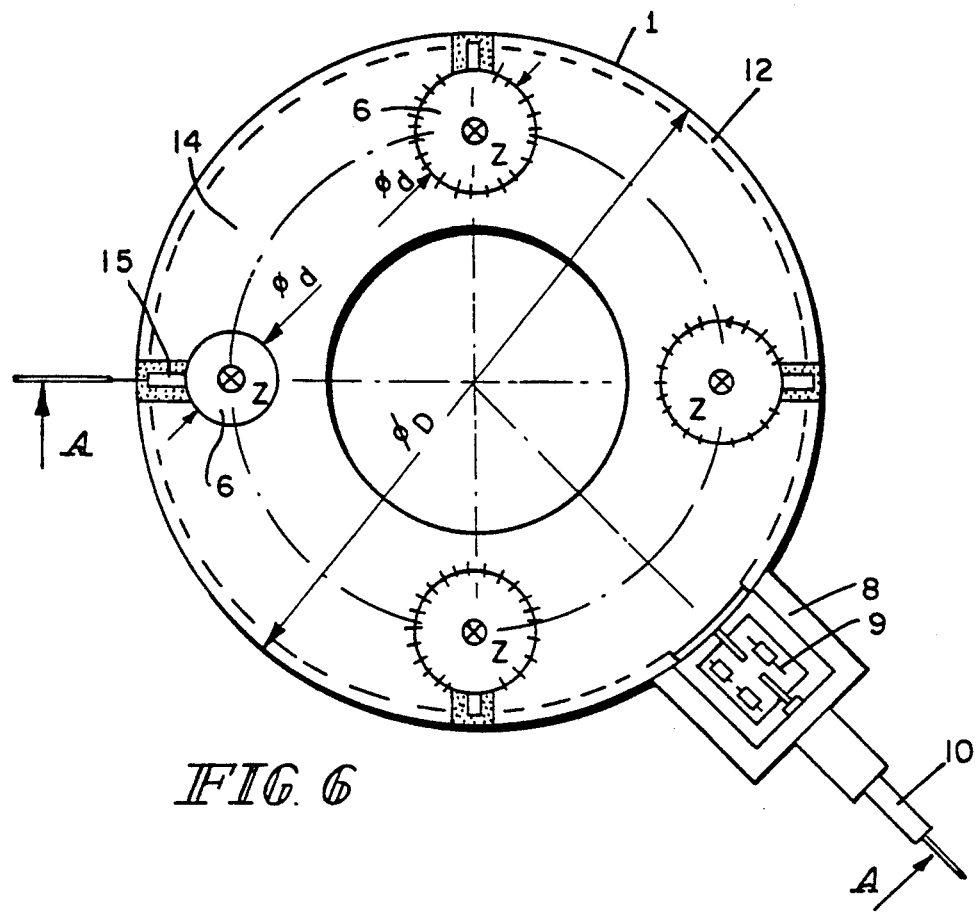
FIG. 6 is a plan view of a thin disk force sensor used in FIG. 1.

FIG. 6 shows a plan of the thin disk force sensor 1 suitable for such purposes. Built into the metal annulus or housing 14 are typically four measuring cells 6 for measuring Z forces. The diameter 'd' of the built-in measuring elements 6, 7 (FIG. 10) is adapted to the specific application. Two diameters 'd' are illustrated in FIG. 6. Small diameters 'd' have a ratio to the diameter 'D' of the force sensor 1 with the advantage of enabling reliable operation for years without breakage of the piezo disks, even in rough machine installations. All four signal electrodes point radially outwards, where they are connected with the connecting cable 10 by the ring line 11 in the cable channel 12 of the annulus 14. In many cases, a preamplifier 9 is accommodated in the connection housing 8 for the purpose of impedance transformation, though the measured charge may also be led straight to an external charge amplifier via cable 10.

Figure 2:
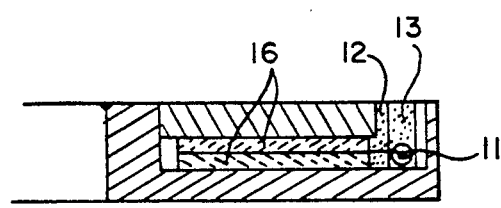
FIG. 2 is a cross-sectional view of a fitted measuring element according to the present invention.

FIG. 2 shows a measuring element which has the cable channel 12. An insulated ring connecting line 11 is in the channel 12 as is insulative sealing compound 13.

Figure 3:
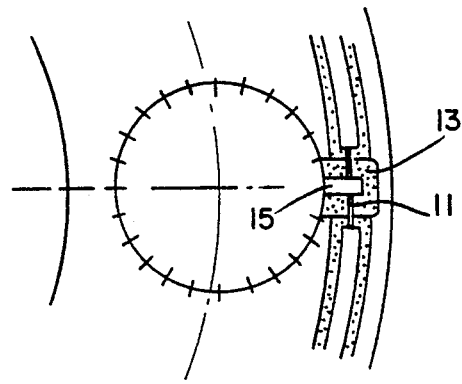
FIG. 3 is a plan view of FIG. 2.
Figure 5:
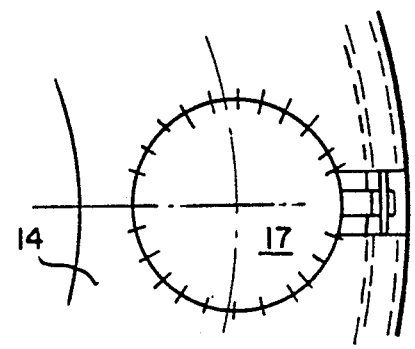
FIG. 5 is a plan view of FIG. 4.

In FIG. 3, the connection of the signal electrode 15 is on the stripped part of the ring connecting line 11. The entire cable channel 12 may be sealed simply from above with a sealing compound 13.

Figure 4:
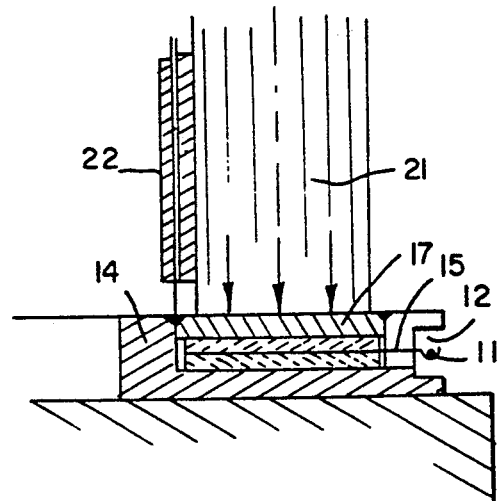
FIG. 4 is a cross-sectional view of welding the measuring element into the sensor disk.
Figure 7:
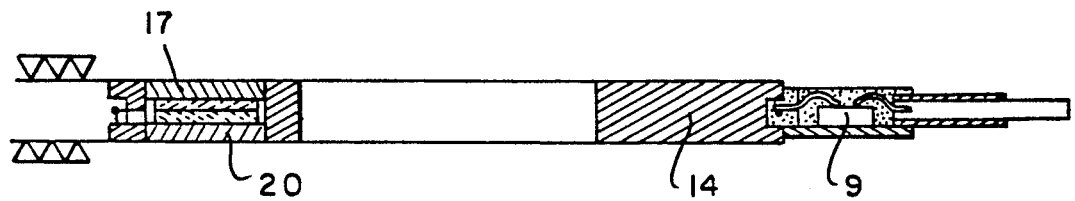
FIG. 7 is a cross-section and view along A—A in FIG. 6.

FIG. 4 shows how a measuring element is welded into a metal annulus 14. A measuring element with metal cover disk 17 are placed in holes in annulus 14. The measuring element is placed under high pressure with the ram 21 and joined to the metal annulus 14 by laser welding via the laser welding fiber 22. The signal electrodes 15 are then connected to the ring line 11 and all open channels are sealed with a highly insulating sealing compound 13. After the compound 13 has set, the metal annulus 14 is ground over on one or both sides, depending on whether a blind hole as in FIG. 4 or a through hole as in FIG. 7 is used to provide a common planar surface. Other suitable welding techniques may also be employed.

Figure 8:
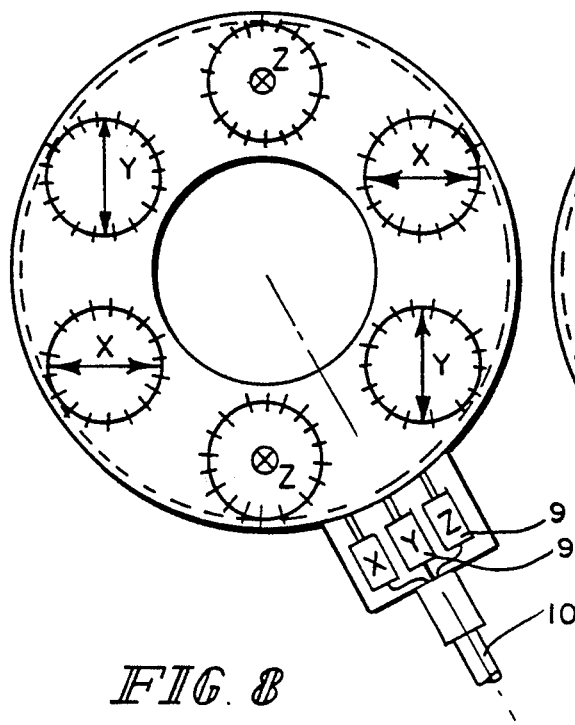
FIG. 8 is a plan view of a thin disk force sensor detecting three coordinate forces X, Y, Z.
Figure 9:
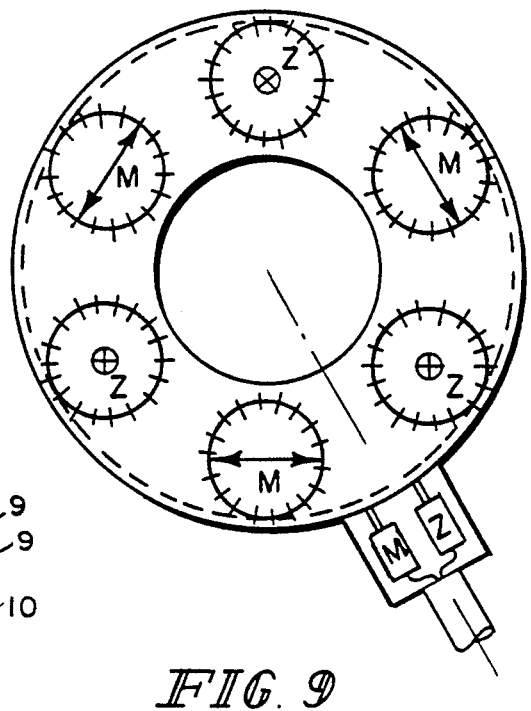
FIG. 9 is a plan view of thin disk force sensor detecting torque and axial force.
Figure 10:
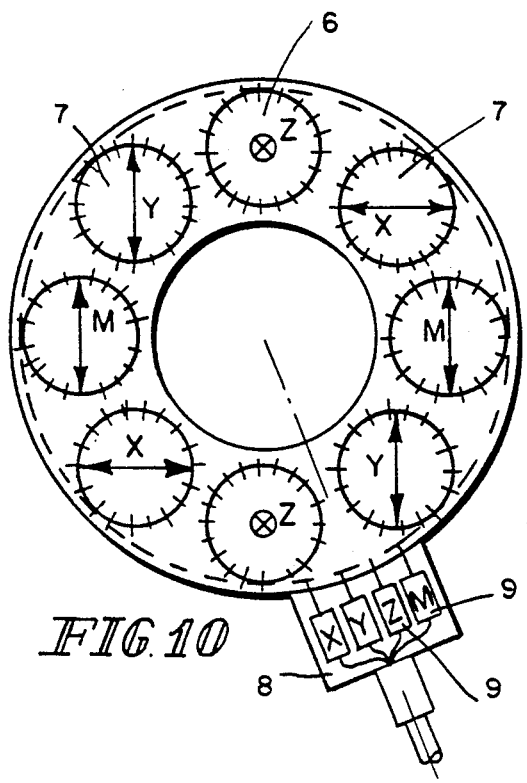
FIG. 10 is a plan view of thin disk force sensor detecting the three coordinates forces and torque.

FIGS. 8, 9 and 10 show embodiments of various multicomponent force sensors according to the invention. FIG. 8 shows measuring the force along three axis X, Y, Z. FIG. 9 shows measuring force along Z axis and torque M. FIG. 10 shows measuring the force along three axis X, Y, Z and torque M. Such sensors are fitted on machine tools, robots, vehicles etc. for monitoring purposes chiefly. These embodiments are shown with preamplifiers 9 for impedance transforming. However in many cases it is better to lead the measuring signals via the connecting cable 10 straight to external corresponding charge amplifiers. Instead of being lead out radially as shown, the connections may be led out centrally also.

Figure 11:
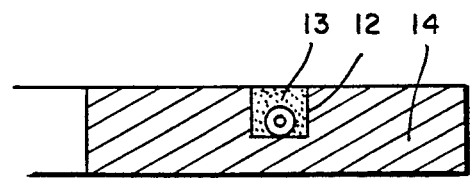
FIG. 11 is a detail view of the signal channel.
Figure 12:
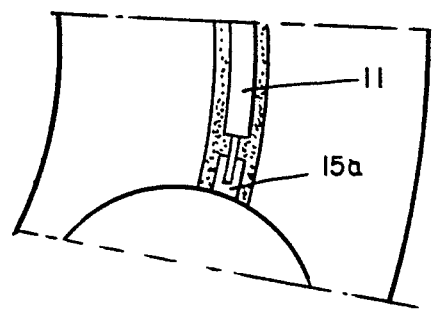
FIG. 12 is a plan view of FIG. 11.

FIG. 11 and 12 show details of the embodiment with the cable channel 12 placed in the middle of the metal annulus 14. The electrodes then have two connecting lugs 15a along their middle.

Figure 13:
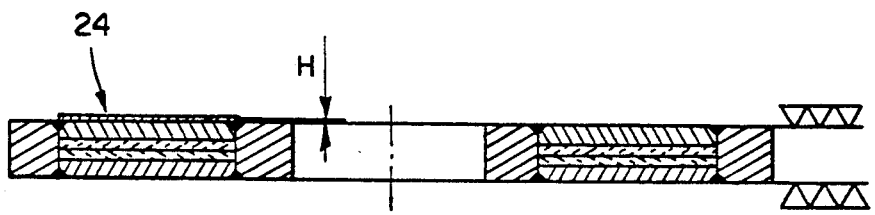
FIG. 13 is cross-sectional view of a thin disk force sensor according to the present invention.
Figure 14:
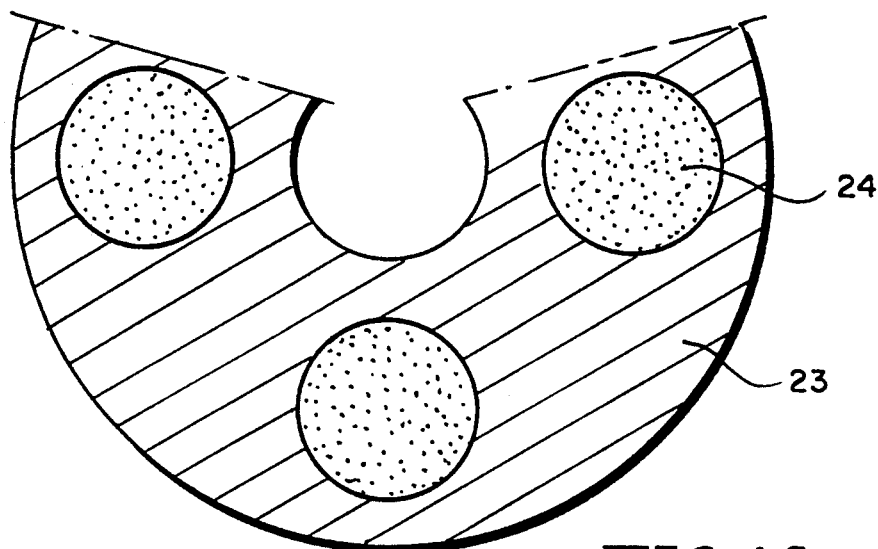
FIG. 14 is a plan view of a vapor deposition stencil for FIG. 13.

FIG. 13 shows the vapor deposition of a coating 24 with predetermined height H, which may be performed in simple fashion using a stencil 23 as shown in FIG. 14. With the coating 24 projecting above the annulus surface, the proportion of the force flow passing through the measuring element 6, 7 can be increased. The coating is a hard material, preferably a metal.

Figure 15:
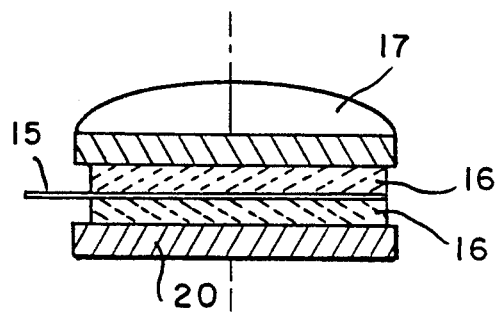
FIG. 15 is a section and view of a measuring element.
Figure 16:
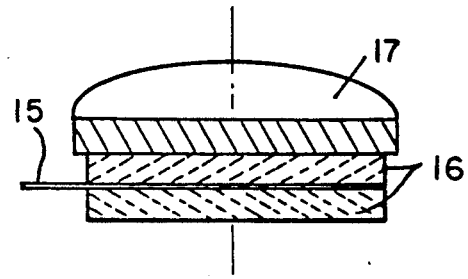
FIG. 16 is a section and view of another measuring element.

FIGS. 15 and 16 show two disk-shaped measuring element types. FIG. 15 shows a metal cover disk 17, two crystal disks 16 with a signal electrode 15 between them and bottom cover disk 20. Measuring cells with piezo-ceramics can be assembled in the same way. This measuring element include four air gaps and five air gap layers.

FIG. 16 shows the same type of measuring element but without a bottom cover disk and having three air gaps and four air gap layers.

Both types of measuring element are fused by known methods to form units, so that only a slight gap effect appears. Instead of fusing they may also be glued, which likewise makes easy installation possible. Instead of two piezo disks 16, one disk 16 and an insulating disk with signal electronics 15 between them may be used.

The invention shows that a large number of combinations for multicomponent force measuring can be assembled with only two measuring element types 6, 7 for pressure and shear. Preassembled measuring elements 6, 7, fitted with disks as thin as possible into carrier disks in the form of metal annuli, allow simple adaptation to complex installation requirements, though other forms may be adopted also.

The reduction of the gap effect to a minimum achieved by the invention brings a previously unattainable reliability in the equality of the output signals from different measuring elements with the same function, and the signals can be predetermined. Moreover, such thin disk force sensors are much simpler to install, because no adapter plates and thrust washers have to be measured and fitted when installing.

Owing to the much more rigid construction, vapor-deposited layers of a few microns thick are sufficient to obtain the desired signal strength. By correct choice of the element diameter 'd', compared to the diameter 'D' of the sensor 1, thin disk force sensors can be produced equal to the most difficult installation conditions and sustaining no crystal breakages even in the long term.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Thin disk force sensor to be fitted between force transmitting element comprising:
    measuring elements each having at least two but not more than five layers forming gaps there between and including at least one individual force introduction layer per measuring element;
    weld means including a weld for individually securing each of said measuring elements under mechanical preloading sufficient to reduce said gaps into a thin disk housing; and said measuring elements, weld and disk housing having a common planar surface.

2. Thin disk force sensor according to claim 1 including a vapor deposited layer of a predetermined thickness on said measuring elements to increase force application compared to said disk housing.

3. Thin disk force sensor according to claim 1 wherein the measuring elements are quartz disks cut in various directions, and having signal electrodes connected to a wire in a groove at the outer circumference of the disk housing.

4. Thin disk force sensor according to claim 1 wherein the measuring elements include piezo-ceramic disks in various orientations, and having signal electrodes connected to a wire in a groove at the outer circumference of the disk housing.

5. Thin disk force sensor according to claim 1 wherein the measuring elements detect only pressure forces.

6. Thin disk force sensor according to claim 1 wherein the measuring elements are oriented so that they detect at least two axis of the force components.

7. Thin disk force sensor according to claim 1, wherein the measuring elements are oriented so that they detect torque and axial force.

8. Thin disk force sensor according to claim 1, wherein the measuring elements are oriented so that they detect force components of three axis and torque.

9. Thin disk force sensor according to claim 1, wherein the measuring elements include a piezo disk and an insulating disk with signal electrode between them.

10. Thin disk force sensor according to claim 1, including at least one preamplifier in a cable connection portion of said housing for converting the high-impedance signal into a low-impedance signal.

11. Thin disk force sensor according to claim 1, wherein said measuring elements are connected to a wire in a groove of the disk housing and including a sealing compound in said groove having a surface in said common planar surface.

12. Thin disk force sensor to be fitted between force transmitting element comprising:

one or more measuring elements each having at least two layers including at least one force introduction layer;

means for securing said measuring elements into a thin disk housing under mechanical preloading;

said measuring elements, securing means and disk housing having a common planar surface; and a vapor deposited layer of a predetermined thickness on said measuring elements to increase the proportion of force conducted to said measuring elements compared to the proportion of force conducted into said disk housing.

13. Thin disk force sensor according to claim 12, wherein said vapor deposited layer has a thickness in the range of a few microns.

14. Thin disk force sensor according to claim 12, wherein said measuring elements are connected to a wire in a groove of the disk housing and including a sealing compound in said groove having a surface in said common planar surface.

15. Thin disk force sensor to be fitted between force transmitting element comprising:

measuring elements each having at least two layers including at least one force introduction layer;

means for securing said measuring elements into a thin disk housing under mechanical preloading;

said measuring elements, securing means and disk housing having a common planar surface; and said measuring elements having individual signal electrodes connected to a wire in a groove at the outer circumference of the disk housing.

16. Thin disk force sensor to be fitted between force transmitting element comprising:

one or more measuring elements each including two piezo disks with signal electrodes between them, with at least one metal cover disk, and means for fusing said piezo disks, signal electrodes and said cover disk together to form a unit;

means for securing said measuring elements under mechanical preloading into a thin disk housing; and said measuring elements, securing means and disk housing having a common planar surface.

* * * * *